United States Patent [19]

Okada et al.

[11] Patent Number: 5,649,514
[45] Date of Patent: Jul. 22, 1997

[54] FUEL SUPPLY APPARATUS

[75] Inventors: Kingo Okada, Kariya; Kouji Izutani, Nagoya; Kazuhiro Sinomiya, Aichi-gun; Keiichi Yamasita; Hideto Takahashi, both of Kariya, all of Japan

[73] Assignee: Nippondenso Co., Ltd., Kariya, Japan

[21] Appl. No.: 677,352

[22] Filed: Jul. 2, 1996

Related U.S. Application Data

[63] Continuation of PCT/JP95/02240, Nov. 2, 1995.

[30] Foreign Application Priority Data

| Nov. 4, 1994 | [JP] | Japan | 6-271597 |
| Feb. 3, 1995 | [JP] | Japan | 7-017308 |
| Feb. 22, 1995 | [JP] | Japan | 7-033927 |

[51] Int. Cl.⁶ ............................................. F02M 37/04
[52] U.S. Cl. ................................... 123/514; 123/509
[58] Field of Search ........................ 137/115.13, 115.26, 137/565, 576; 123/509, 510, 511, 514, 516

[56] References Cited

U.S. PATENT DOCUMENTS

| 4,543,938 | 10/1985 | Szlaga | 123/514 |
| 4,570,604 | 2/1986 | Thornton et al. | 123/514 |
| 4,617,116 | 10/1986 | Seiler | 123/514 |
| 4,860,713 | 8/1989 | Hodgkins | 123/510 |
| 5,036,822 | 8/1991 | Kojima | 123/509 |
| 5,076,920 | 12/1991 | Danowski et al. | 210/243 |
| 5,078,167 | 1/1992 | Brandt et al. | 137/115.13 |
| 5,103,793 | 4/1992 | Riese et al. | 123/516 |
| 5,195,494 | 3/1993 | Tuckey | 123/514 |
| 5,218,942 | 6/1993 | Coha et al. | 123/514 |
| 5,231,967 | 8/1993 | Baltz et al. | 123/516 |
| 5,392,750 | 2/1995 | Laue et al. | 123/509 |
| 5,469,829 | 11/1995 | Kleppner et al. | 123/514 |
| 5,520,156 | 5/1996 | Brunnhofer | 123/516 |
| 5,533,478 | 7/1996 | Robinson | 123/456 |

FOREIGN PATENT DOCUMENTS

| Y2-61-31174 | 9/1986 | Japan . |
| A-2-191862 | 7/1990 | Japan . |
| U-3-68558 | 7/1991 | Japan . |
| U-3-108853 | 11/1991 | Japan . |

Primary Examiner—Thomas N. Moulis
Attorney, Agent, or Firm—Nixon & Vanderhye

[57] ABSTRACT

A fuel pump and a fuel filter inside a fuel tank and a pressure regulator are supported by a cover closing for an opening of the fuel tank. The fuel sucked by the fuel pump flows into the fuel filter and flows out to the lower side chamber of a filter housing after being filtered by an element. The fuel consumed at the fuel consumption device such as an internal combustion engine is supplied through a fuel passage extending upward from the lower side chamber of the filter housing. On the other hand, water mixed in the fuel is accumulated in the lower side chamber. Especially, glass fibers having high water affinity is mixed in the filter element, so that water is trapped, becomes water drops, and fall to the lower side chamber. Water drops return to the fuel tank with surplus fuel through the pressure regulator disposed at the bottom of the housing.

20 Claims, 9 Drawing Sheets

FUEL SUPPLY APPARATUS

This is a continuation of PCT Application PCT/JP95/02240, filed Nov. 2, 1995.

TECHNICAL FIELD

The present invention relates to a fuel supply apparatus for supplying fuel from a tank to a fuel consumption device such as an internal combustion engine, which is mounted on the fuel tank of a vehicle for example.

BACKGROUND ART

A fuel supply apparatus for supplying fuel to the internal combustion engine disclosed in the U.S. Pat. No. 5,078,167 or No. 5,195,494 have been conventionally known. In the structure of U.S. Pat. No. 5,078,167, a pressure regulator disposed below a fuel filter returns surplus fuel into a fuel tank before the fuel enters a fuel filter. On the other hand, in the structure of U.S. Pat. No. 5,195,494, a pressure regulator disposed in a fuel pump inside a fuel tank returns surplus fuel into the fuel tank from the fuel pump. Theses apparatuses reduce the rise of a temperature inside the fuel tank by eliminating returned surplus fuel, i.e., return fuel from the internal combustion engine to the fuel tank.

However, when the return fuel is eliminated, since the fuel flowing amount in a pipe from the fuel tank to the internal combustion engine as well as in a passage of a fuel injection apparatus mounted on the internal combustion engine is decreased, water mixed in the fuel may be accumulated, and corrosion of metal parts and malfunction of the apparatuses may be caused due to the water.

The above-described conventional technology may cause the water to be sent to the internal combustion engine with the fuel, in addition, the water mixed in the fuel becomes water drops inside the housing of the fuel filter and the water drops may be sent to the internal combustion engine as they are.

DISCLOSURE OF THE INVENTION

In light of the problem in the above-described conventional technology, the present invention has an object of providing an improved fuel supply apparatus.

In light of the problem in the above-described conventional technology, the present invention has another object of providing an improved fuel filter housing.

The present invention has a further object of reducing water sent to the fuel consumption device.

The present invention has a still further object of reducing water sent to the fuel consumption device with a structure easily manufactured.

The aforementioned objects of the present invention can be achieved by disposing a valve means for opening or closing a passage corresponding to fuel pressure as to communicate with a lower space of a separator and by discharging water with fuel from the lower space of the separator when the pressure of the fuel reaches a predetermined condition.

Further, it is desirable to dispose an inlet and an outlet of the separating chamber above a return passage to ensure separation of the water inside the separating chamber.

Still further, it is desirable to accommodate the separating chamber, the return passage, and the valve means inside the fuel tank for improving reliability to prevent fuel leakage.

Still further, it is desirable to employ a pressure regulator as a valve and to discharge water with surplus fuel.

Still further, it is desirable for a member forming the separating chamber to form a cover closing the opening of a fuel tank.

Still further, it is desirable for a member forming the separating chamber to be detachably mounted On a cover closing the opening of a fuel tank.

The aforementioned objects of the present invention can be achieved by taking out the fuel from the lower side space of the fuel filter and by disposing a pressure regulator for returning the fuel as surplus fuel to the fuel tank.

Further, it is desirable that the fuel filter has a first outlet to the fuel consumption device and a second outlet through which the surplus fuel passes, and the second outlet should be opened below the first outlet to ensure separation of the water inside the fuel filter.

Still further, it is desirable for the surplus fuel to return after passing the fuel filter element and also water affinity fibers should be mixed with the fuel filter element.

Still further, it is desirable to fix the pressure regulator to the filter housing.

The filter housing can be detachably mounted on the cover of the fuel tank.

Moreover, it is desirable that the filter housing should be combined with the cover of the fuel tank. In this case, it is desirable that an inlet directly connected to a discharging pipe of the fuel pump supported by the cover and an outlet connected to the fuel consumption device are integrally disposed with the cover and the filter housing, so that fuel passages can be connected without using additional pipes.

The aforementioned objects of the present invention can be achieved by disposing a second outlet as an outlet of surplus fuel below the fuel filter housing to enable to discharge the water accumulated in the filter housing with the surplus fuel.

Further, it is desirable that the connecting portion for connecting the pressure regulator is integrally mounted outside the filter housing.

Further, it is desirable to combine the filter housing with the cover closing the opening of the fuel tank, however, the housing can be integrally and non-separatively formed with the cover or can be installed to be mounted or dismounted on the cover.

An inlet, the first outlet, and the second outlet should be respectively disposed to ensure separation of the water inside the filter housing.

BEST MODE FOR CARRYING OUT THE INVENTION

Embodiments of the present invention is hereinafter described with reference to the accompanying drawings.

(First Embodiment)

Figure 1:
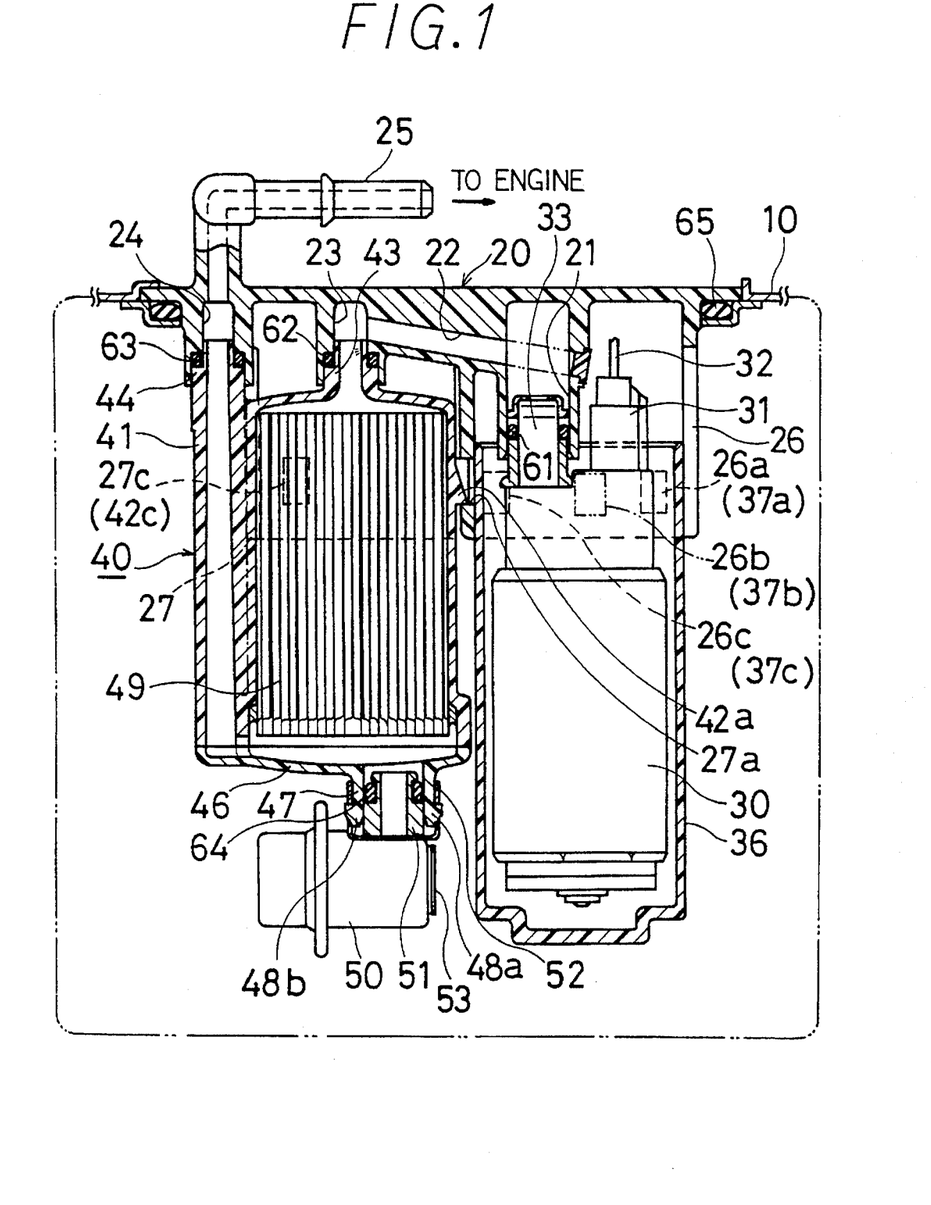
FIG. 1 is a longitudinal cross sectional view in a first embodiment according to the present invention.
Figure 2:
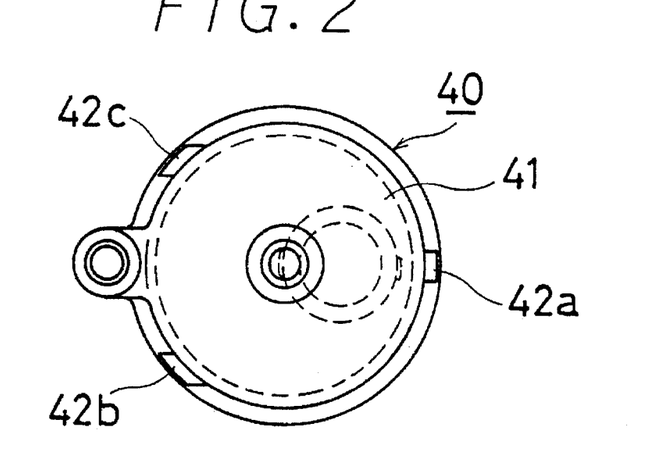
FIG. 2 is a top plan view of a fuel filter in the first embodiment.
Figure 3:
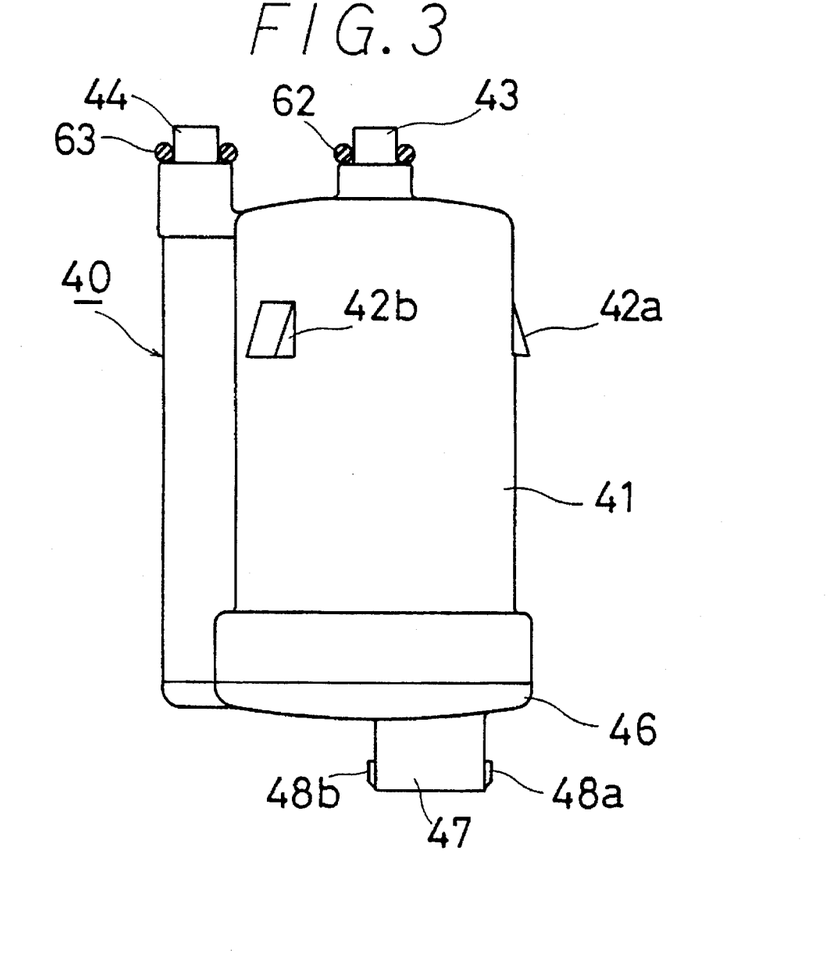
FIG. 3 is a side view of the fuel filter in the first embodiment.
Figure 4:
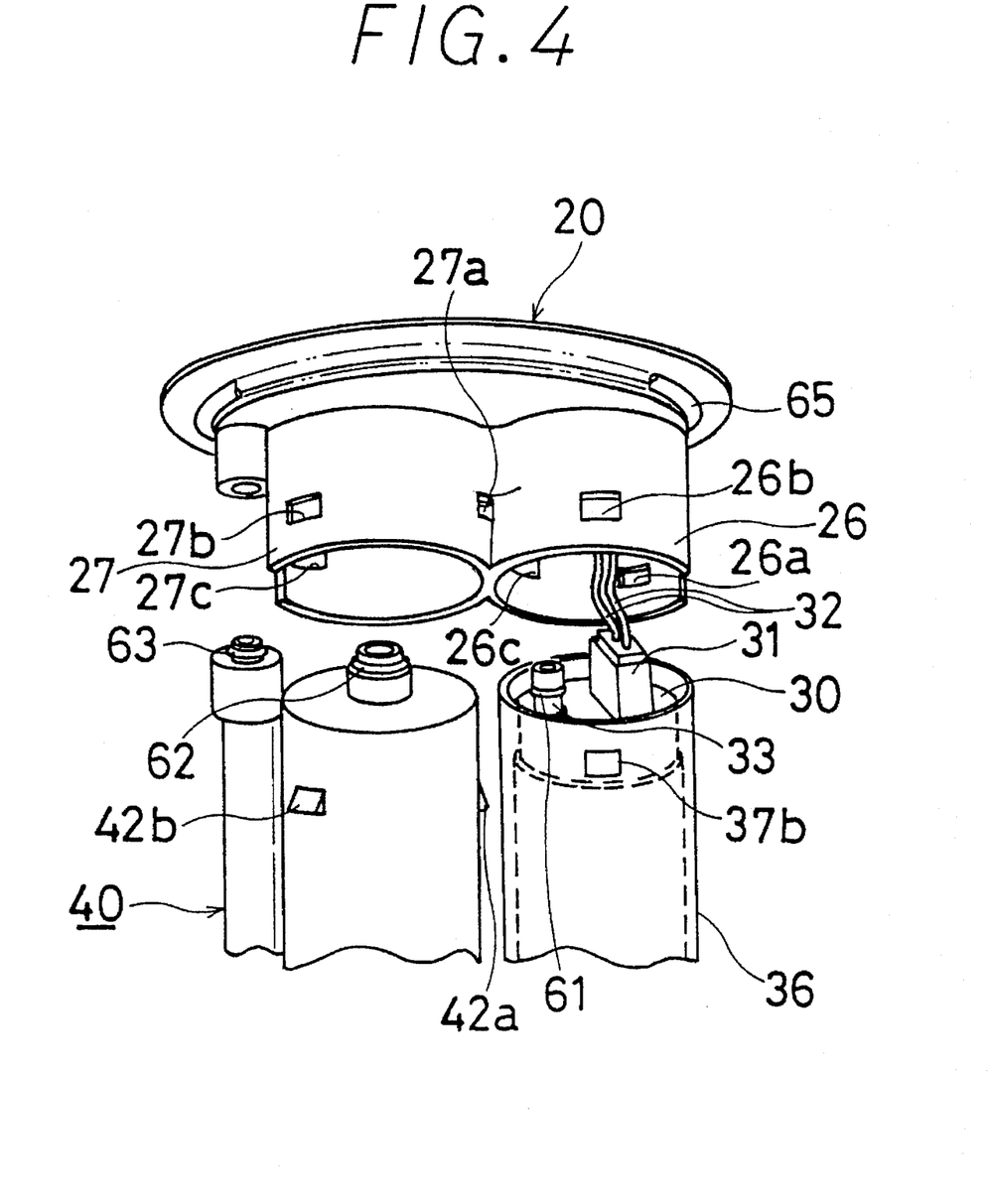
FIG. 4 is a fragmental perspective view of main portions in the first embodiment.

FIG. 1 is a cross sectional view showing the structure of the fuel filter and the fuel supply apparatus according to a first embodiment. FIG. 2 is a top plan view. FIG. 3 is a front view showing the appearance of the fuel filter itself of FIG. 1, and FIG. 4 is a fragmentally perspective view showing a connecting structure.

At an opening portion of a fuel tank 10, a cover 20 made of resin is provided. Fuel passages 21, 22, 23, and 24 are integrally formed inside the fuel tank 10 of the cover 20, furthermore, a connector 25 for connecting a pipe to supply the fuel to an internal combustion engine (not shown) is also integrally molded outside the fuel tank at the top end of the downstream side of the fuel passage 24.

A fuel pump 30 is connected to an electric connector 31 to which electricity is supplied from the outside of the fuel tank 10 via a wiring code 32 and an electric connector 31.

The lower end of the fuel pump 30 is supported by a cup-shaped pump holder 36 with a rubber spacer (not shown) and a fuel outlet 33 is liquid-tightly connected to the fuel passage 21 of the cover 20 with an O-ring 61. At the same time, by engaging fixing claw portions 37a, 37b, and 37c formed on the outer periphery of the pump holder with fixed holes 26a, 26b, and 26c formed at a wall surface guide portion 26 of the cover 20, the fuel pump 30 and the cover 29 are fixed.

The fuel inlet of the fuel pump 30 located deep inside (back) below the fuel pump 30 of FIG. 1 is connected to a bad-shaped mesh filter (not shown in the figure). The mesh filter extending and protruding from the bottom of the pump holder 36 enables to suck the fuel in the vicinity of the bottom of the fuel tank 10.

The numeral 40 represents a fuel filter which is composed of filter housings 41 and 46. A cylindrical filter element 49 for filtering dust or the like in the fuel is installed inside the filter housing 41. The circumference of the filter element 49 is adhered to the fuel filter 40 in such a manner that the filter element 49 is incorporated in a state to prevent the fuel from passing therearound. The filter housing 41 and the filter housing 46 made of, for example, polyacetal resin are integrally connected with thermal fusion.

The fuel inlet 43 of the fuel filter 40 is liquid-tightly connected to the fuel passage 23 of the cover 20 with an O-ring 62, whereas the fuel outlet 44 is also liquid tightly connected to the fuel passage 24 of the cover 20, respectively. At the same time, by engaging fixing claw portions 42a, 42b, and 42c formed on the outer periphery of the filter housing 41 of the fuel filter 40 with fixing holes 27a, 27b, and 27c formed at the cover 20, the fuel filter 40 and the cover 20 are fixed. In addition, the fuel passage 21 and the fuel passage 23 of the cover 20 are communicated by the fuel passage 22.

The fuel outlet 47 and fixed clicks 48a and 48b are formed on the filter housing 46 located at the downstream side of the filter element 49 installed in the fuel filter 40. A pressure regulator 50 for adjusting and maintaining a fuel pressure (pressure of the fuel) to and at a predetermined pressure is liquid-tightly connected to the fuel outlet 47 with an O-ring 64 disposed in the inserting portion 51. At the same time, by engaging fixing claw portions 48a and 48b of the fuel outlet 47 of the filter housing 46 with a fixing member 52 of the pressure regulator 50, the pressure regulator 50 and the fuel filter 40 are fixed. The cover 20 fixing the fuel pump 30 and the fuel filter 40 is liquid-tightly fixed to the opening of the fuel tank 10 with an O-ring 65, which closes the opening of the fuel tank 10.

In the above-described structure, the fuel stored inside the fuel tank 10 is sucked by a driving operation of the fuel pump 30, enters the fuel inlet 43 of the fuel filter 40 after passing through the fuel passages 221, 22, and 23 of the cover 20 from the fuel outlet 33. Then, it is filtered by the filter element 49 and is adjusted to a predetermined pressure by the pressure regulator 50. Finally, the fuel is supplied to the internal combustion engine from the connector 25 outside the cover 20 after passing through the fuel passage 24 of the cover 20 from the fuel outlet 44 of the fuel filter 40. Surplus fuel generated by fuel pressure adjustment by the pressure regulator 50 returns to the fuel tank 10 from its opening 53.

When the fuel pump is damaged, the cylindrical wall surface guide 26, on which the fixed holes 26a, 26b, and 26c are formed, of the cover 20 is pressed and extended after the cover 20 is detached from the fuel tank 10 to release engagement with the fixing claw portions 37a, 37b, and 37c formed on the outer periphery of the cup-shaped pump holder 36, so that the fuel pump 30 can be detached from the cover 20.

Similarly, when the fuel filter 40 is clogged up or the like, the cylindrical wall surface guide 27, on which the fixed holes 27a, 27b, and 27c are formed, of the cover 20 is pressed and extended after the cover 20 is detached from the fuel tank 10 to release the engagement with the fixing claw portions 42a, 42b, and 42c formed on the outer periphery of the filter housing 41 of the fuel filter 40, so that the fuel filter 40 can be detached from the cover 20.

According to the present embodiment, the fuel filter 40 at the high pressure side disposed inside the fuel tank can be changed while being kept in the housing. Moreover, since the filter 40 is connected without using a hose or the like, it is easy to attach or detaching the filter. Furthermore, since the fuel filter 40 has one inlet and two outlets are provided with the fuel filter 40 and the pressure regulator 50 is connected to the outlets, the structure of the apparatus itself can be simplified. Still further, the pressure regulator 50 is disposed below the filter 40, and the outlets are provided in the passage of the wall surface at the lowest side of the filter 40 to discharge surplus fuel from these outlets through the pressure regulator, water mixed in the fuel can be separated inside the filter housing and can be discharged from the pressure regulator 50.

(Second Embodiment)

Figure 5:
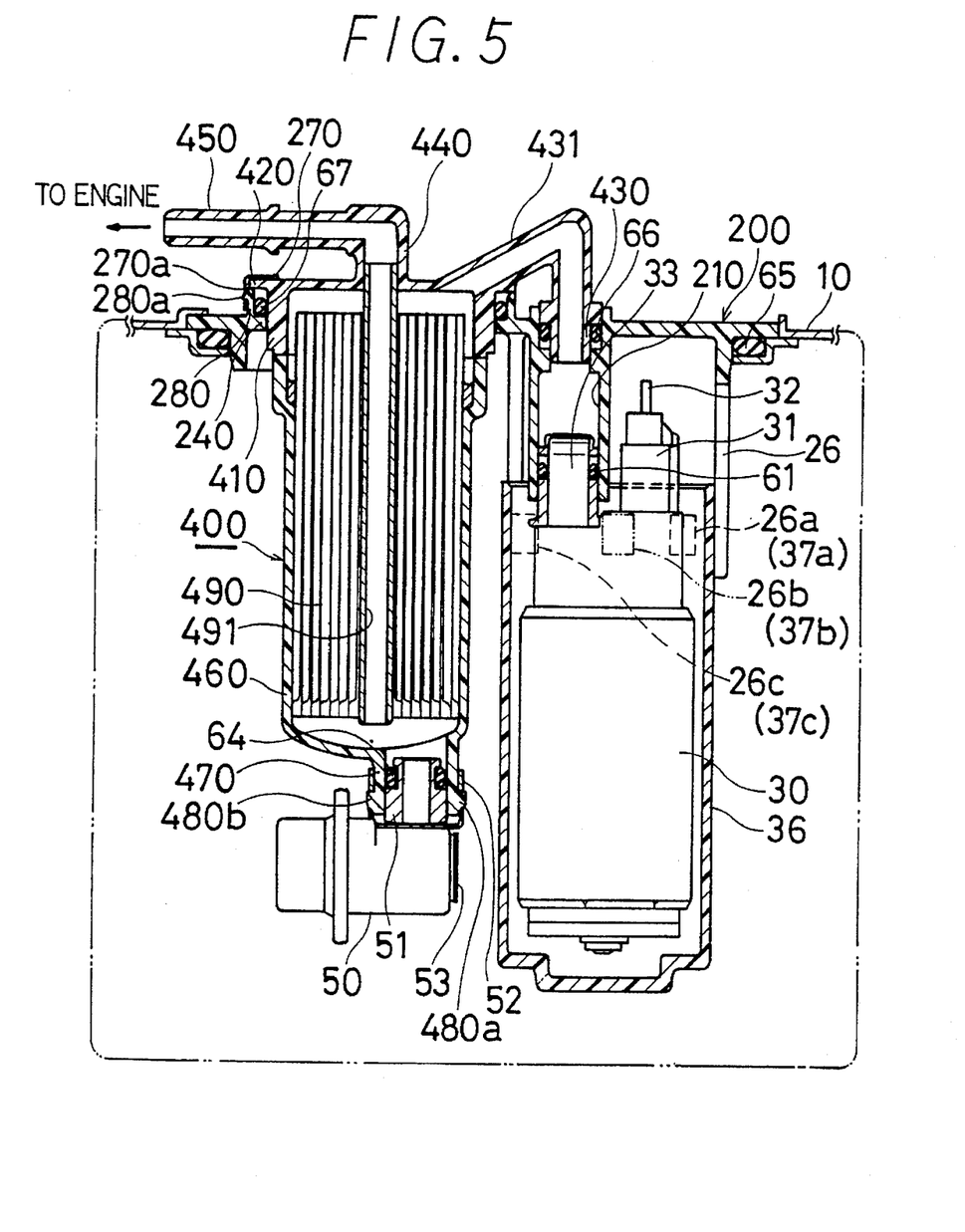
FIG. 5 is a longitudinal cross sectional view in a second embodiment.
Figure 6:
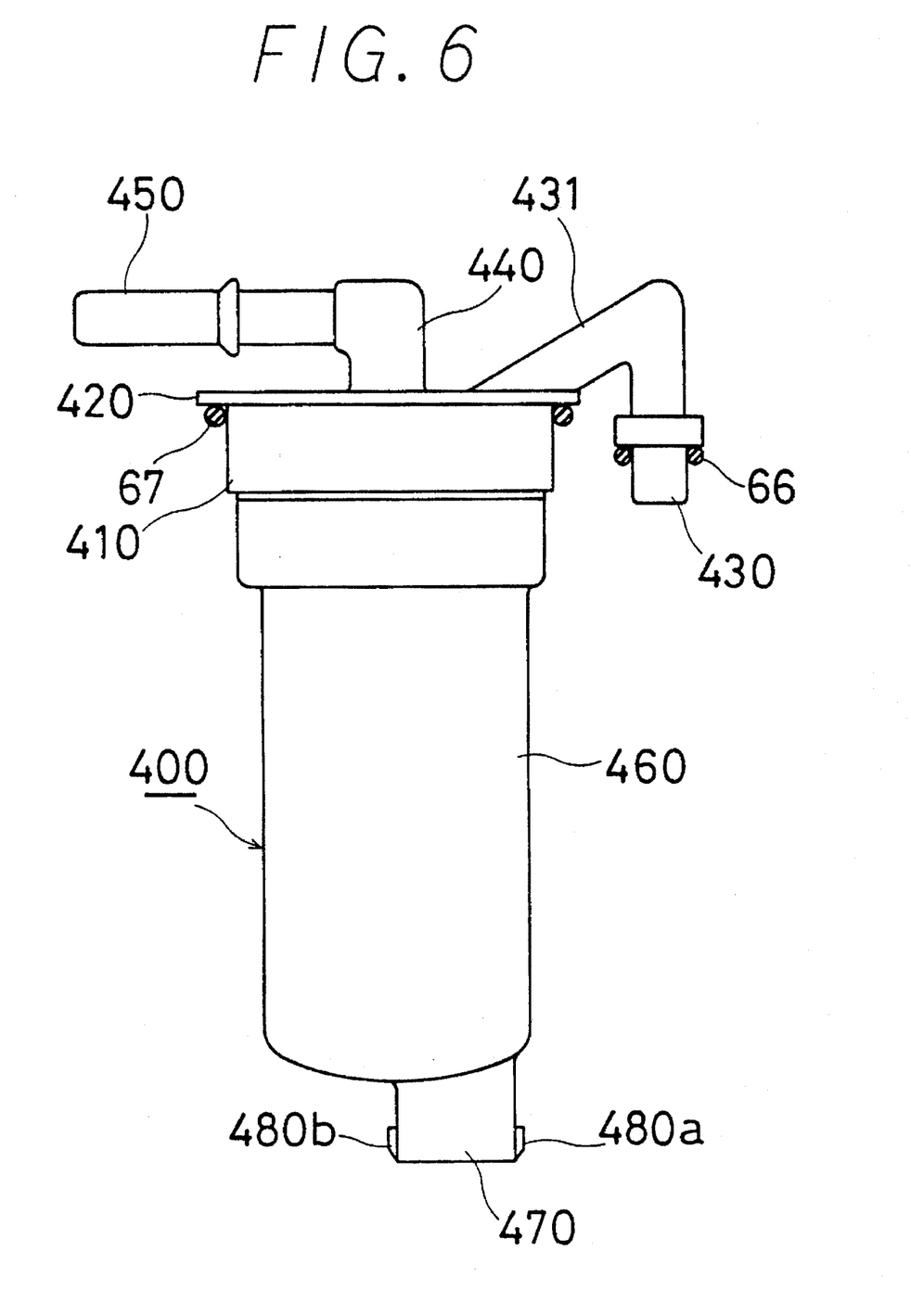
FIG. 6 is a side view of a fuel filter in the second embodiment.

FIG. 5 is a partial cross sectional view showing a fuel filter and a fuel supply apparatus according to the second embodiment of the present invention. FIG. 6 shows an outside appearance of the fuel filter of FIG. 7.

The same numerals are used for the same components or the equivalent portions as in the first embodiment, and the detailed explanation is omitted.

The numeral 200 is a cover for closing the opening of the fuel tank 10. A fuel passage 210 is integrally formed inside the fuel tank 10 of the cover 200. The pump holder 36 supports the outer periphery of the fuel pump 30, and the fuel outlet 33 is liquid-tightly connected to a fuel passage 210 of a cover 120 with an O-ring 61. At the same time, by engaging fixing claw portions 37a, 37b, and 37c formed on the outer periphery of the pump holder 36 with fixing holes 26a, 26b, and 26c formed at the wall surface guide portion 26 of the cover 200, the fuel pump 30 and the cover 200 are fixed. The fuel inlet of the fuel pump 30 located deep inside (back) below the fuel pump 30 in FIG. 4 is generally connected to a suction side filter (not shown).

The numeral 400 represents a fuel filter which is composed of filter housings 410 and 460. A filter element 490 for filtering dust or the like in the fuel is installed inside the filter housing 460. The circumference of the filter element 490 is adhered to the fuel filter 400 in such a manner that the filter element 490 is incorporated in a state to prevent the fuel from passing therearound. The filter housing 410 and the filter housing 460 made of polyacetal resin, for example, are integrally connected with thermal fusion.

A fuel inlet 430 of the fuel filter 400 is liquid-tightly connected to a fuel passage 210 of the cover 200 with an O-ring 66. A fuel passage 431 is integrally formed with the filter housing 410 at the downstream side of the fuel inlet 430. A connector 450 for connecting a pipe to supply the fuel to the internal combustion engine (not shown) is also integrally formed outside the fuel tank at the top end of the downstream side of a fuel outlet 440. The filter housing 410 at the base of the downstream side of the fuel passage 431 is liquid-tightly connected to the opening 240 of the cover 200 with an O-ring 67. A flange portion 420 of the filter housing 410 is disposed around a cylindrical wall 280 of the opening 240 of the cover 200. On the cylindrical wall 280, three fixing claw portions 280a (280b and 280c) are disposed and engaged with the fixing holes 270a (270b and 270c) disposed on a fixing member 270, and thereby the fuel filter 400 and the cover 200 are fixed.

A fuel outlet 470 and fixing claw portions 480a and 480b are formed on a filter housing 460 at the downstream side of the filter element 490 installed in the fuel filter 400. The pressure regulator 50 is liquid-tightly connected to the fuel outlet 470 with an O-ring 64 disposed in the inserting portion 51. At the same time, by engaging the fixing member 52 of the pressure regulator 50 with fixing claw portions 480a and 480b of the fuel outlet 470 of the filter housing 460, the pressure regulator 50 and the fuel filter 400 are fixed. The cover 200 fixing the fuel pump 300 and the fuel filter 400 is liquid-tightly fixed to the opening of the fuel tank 10 with the O-ring 65, and thereby the opening of the fuel tank 10 is closed.

In the above-described structure, the fuel stored inside the fuel tank 10 is sucked by a driving operation of the fuel pump 30, enters a fuel inlet 430 of the fuel filter 400 after passing through the fuel passages 210 of the cover 200 from the fuel outlet 33. Then it is filtered by the filter element 490 after passing through a fuel passage 431 and is adjusted to a predetermined pressure by the pressure regulator 50. Then, after passing through a central passage 491 of the fuel filter 400, the fuel is finally supplied to the internal combustion engine from the connector 450 outside the fuel outlet 440. Surplus fuel generated by fuel pressure adjustment by the pressure regulator 50 returns to the fuel tank 10 from its opening 53.

When the fuel pump is damaged, similarly to the first embodiment, the cover 200 can be detached from the fuel tank 10 for maintenance. On the other hand, when the fuel filter 400 is clogged up, the fuel filter 400 can be detached from the cover 20 to release the engagement of the fixing claw portions 280a (280b and 280c) formed on the outer periphery of the cylindrical wall 280 of the opening 240 of the cover 200 with the fixing holes 270a (270b and 270c) of the fixing member 270, so that the fuel filter 400 can be detached from the cover 200 without detaching the cover 200 from the fuel tank 10 in the present embodiment.

By the way, according to the aforementioned embodiments, both the fuel filter and the fuel pump are detachably mounted on the cover, however, it is preferable for the fuel filter to be detachably mounted on the cover with a fixing portion.

(Third Embodiment)

Figure 7:
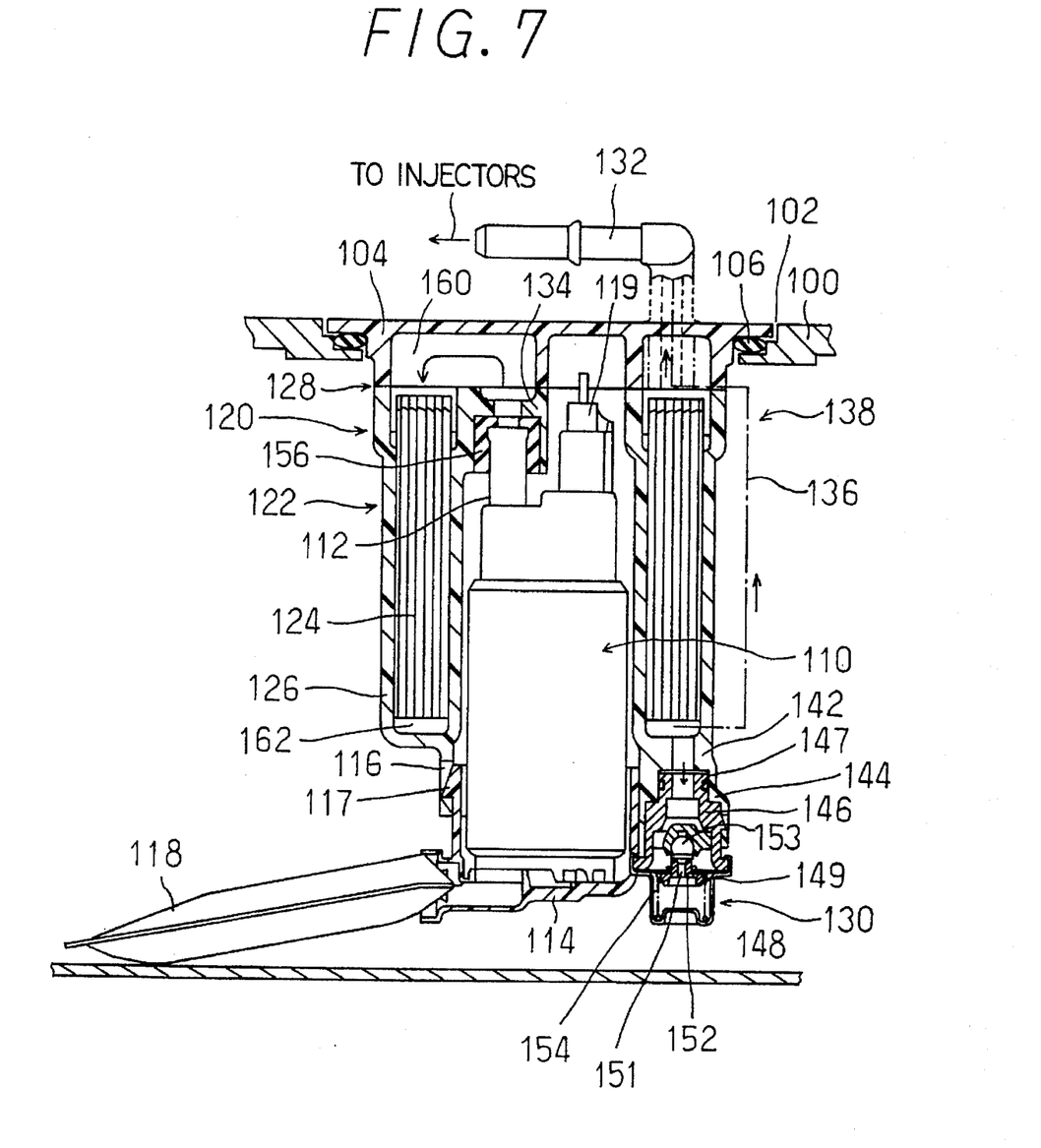
FIG. 7 is a longitudinal cross sectional view in a third embodiment.
Figure 8:
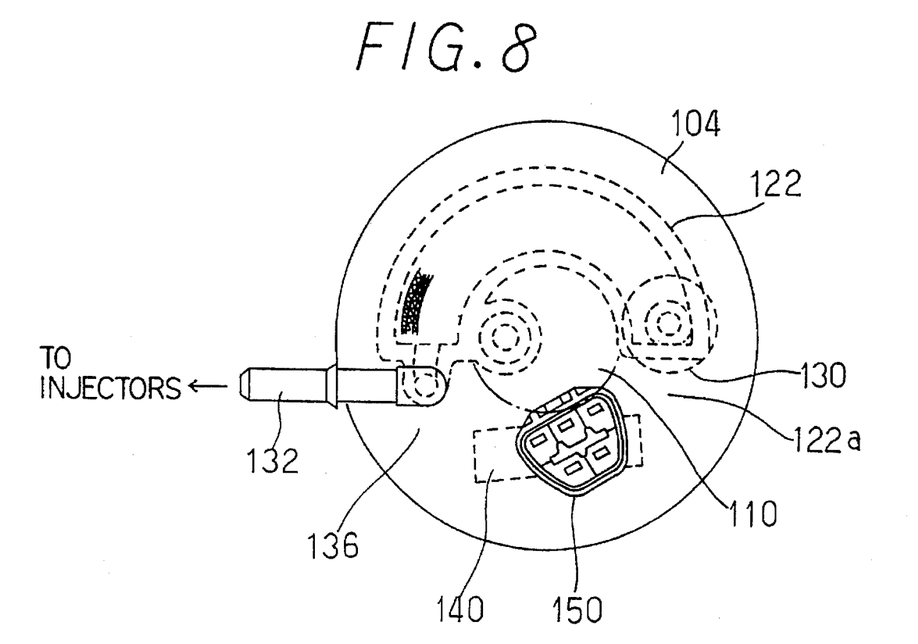
FIG. 8 is a top plan view in the third embodiment.

FIGS. 7 and 8 show fuel supply apparatuses according to a third embodiment of the present invention.

In the present embodiment, a cover 104 closing an opening 102 of a fuel tank 100 is integrally assembled with functional parts of the fuel supplying system such as a fuel pump 110, a fuel filter 120, a pressure regulator 130, a fuel level gauge 140, an electric connector 150 and a fuel pipe 132 as one unit.

An opening 102 is formed in the fuel tank 100 made of metal or resin. A cover 104 made of resin having electric insulation is also disposed to close the opening 102. A gasket 106 for sealing is disposed between the cover 104 and the fuel tank 100.

The fuel filter 120 is so constructed that the filter element 124 is accommodated inside the housing 122. Furthermore, the cover 104 is a part of the housing 122 and hangs the fuel filter 120 from the cover 104.

The element 124 is so constructed as to wind a unit made of adhering a flat filtering paper to a wavy filtering paper in a state into a hollow ring shape and is cut along the diameter. The main raw material of the filtering paper has high affinity to the filtered object, i.e., the fuel, especially glass fibers having high affinity to water are mixed therein. Therefore, water mixed in the fuel adheres to the glass fibers and becomes water drops. In this state, it can be easily separated from the fuel and flows out to a lower portion of the housing 122.

The filter housing 122 is composed of the cover 104 as an upper housing and a lower housing 126. The lower housing 126 is molded with resin material including conductive material such as carbon fibers or carbon powder or the like, so that the filter housing 122 has electric conductivity. The upper housing 104 and the lower housing 126 are liquid-tightly welded at the boundary 128.

As shown in FIG. 8, the housing 122 is not formed in a complete ring, however, is formed in an incomplete ring shape having a space 122a ranging substantially 90° partially, thus, it has a C-shaped cross-section. The upper housing 104 made of insulating resin is integrally molded with the discharge pipe 132. The lower housing 126 accommodating and fixing the element 124 has a cup-shaped portion with a C-shaped cross-section.

One fuel inlet and two fuel outlets are provided on the housing 122 of the fuel filter 120. An inlet pipe 134 as a fuel inlet is disposed above the inner periphery side of the housing 122 and connected to a discharge pipe 112 of the fuel pump 110. A pipe 136 forming the first fuel outlet out of the two fuel outlets extends upward along the axial direction from the lower end of the lower housing 126. The pipe 136 is integrally molded adjacent to the cup-shaped portion of the lower housing 126 and is located at notch space 122a of the housing 122. The pipe 136 communicating with the discharge pipe 132 disposed on the cover 104 forms a fuel passage 138 for supplying the fuel after filtered to the injectors. The other fuel outlet, i.e., the second outlet forms a return pipe 142 and is disposed below the lower housing 126 and connected to the pressure regulator 130. It is important for the return pipe 142 to be opened at the lower end of the lower housing 126.

The pressure regulator 130 is fitted into and fixedly engaged with a cylindrical portion 144 extending downward from the bottom of the lower housing 126. An O-ring 147 is disposed between a body and the cylindrical portion 144, so that the claw of the body 146 can be detachably fastened in the hole of the cylindrical portion 144 like a press stud. Accordingly, the pressure regulator 130 can be easily detached from the filter housing 12 by detaching the body 146 from the cylindrical portion 144. A diaphragm 149, inserted between the open end of the body 146 and the housing 148, supports a movable valve seat 152 to which a discharge passage 151 is open. A fixing valve body 153 co-operating with the valve seat 152 is fixed inside the body 146. A compressed coil spring 154 is accommodated between the housing 148 and the diaphragm 149. A hole (not shown in the figure) is open the housing 148 such that a spring chamber is set at an atmospheric pressure or a tank interior pressure and the fuel is discharged from the discharge passage 151.

In the pressure regulator 130, when a fuel pressure inside the body 146 exceeds a spring set pressure, the diaphragm 149 moves to the spring chamber side to open the discharge passage 151 of the movable valve seat 152 in order to return the fuel inside the body 146 to the fuel tank 1. Thus, the pressure of the fuel discharged by the fuel pump 110 and supplied from the fuel filter 120 to the injectors can be maintained at a predetermined pressure.

According to the present embodiment, the claw of the body 146 is fastened to a hole of the cylindrical portion 144 to fix the pressure regulator 130, however, by extending a stay from the pump holder 114 and just inserting the body 146 into the cylindrical portion 144, the housing 148 of the pressure regulator 130 can be supported from the lower side with an extending stay from the pump holder 114.

A fuel pump 110 is accommodated at the inner periphery side of the filter housing 122 formed in a C-shaped ring, and is supported from the lower side by the cup-shaped pump holder 114. Plural holes 116 are opened at a skirt portion extending below the inner periphery of the filter housing 122 so as to be scattered in the peripheral direction, and a claw 117 of the pump holder is engaged therewith. Thus, the fuel pump 110 can be detachably installed on the filter housing 122. The fuel discharge pipe 112 protruding at the top of the fuel pump 110 is connected to the inlet pipe 134 with the gasket 156. Furthermore, a resin-made mesh filter 118 is installed the pump holder 114. By installing the pump holder 114 below the fuel pump 110, suction inlet disposed below the fuel pump 110 is so constructed as to. communicate with the inside of the filter 118. Similarly to a conventional fuel pump, a check valve is accommodated inside the discharge pipe 112 to keep residual pressure of the fuel inside the fuel pipe when the fuel pump 110 is stopped.

The fuel level gauge 140 is installed in the space 122a of the housing 122 of the fuel filter 120. A float (not shown) extends from the fuel level gauge 1140 to indicate a resistant value corresponding to the fuel level.

The electric connector 150 is integrally molded with the cover 104 such that a terminal pin is disposed in the resin material of a cover 104 by insertion molding. As shown in FIG. 8, the electric connector 150 is disposed at a position so as not to overlap the fuel filter 120. The terminal of the electric connector 150 is connected to the power source and the control unit outside the fuel tank, also is electrically connected to the electric connector 119 of the fuel pump 110 via a lead wire (not shown in the figure) inside the fuel tank in order to supply electric power to the motor and is also connected to the fuel level gauge 140 via a lead wire (not shown) to transmit an electric signal indicating the fuel level.

In this way, the filter is disposed in a range with a certain angle partially on the outer periphery of the fuel pump 110, and functional parts such as the fuel pipe 132, the electric connector 10, and the fuel level gauge 140 are installed at the remaining portions.

A flow of the fuel is described.

When the electric power source is supplied to the fuel pump 110 through the electric connectors 150 and 119, the fuel pump 110 sucks the fuel through the filter 118 and discharges the fuel from the discharge pipe 112. The fuel flows inside the passage 160 between the upper housing 126 and the lower housing 104 in the arrow mark direction. The fuel, flowing inside the housing 122 from the upward direction to the downward direction on the midway, is filtered by passing through the filter element 124. When the fuel reaches the lower space 162 of the housing 122 after passing through the element 124, a part of the fuel returns to the fuel tank 100 by the pressure regulator 130 for adjusting the fuel pressure. Remaining part of the fuel is supplied to the injectors of the fuel injection apparatus mounted on the engine after passing through the pipes 136 and 132. According to the present embodiment, the return fuel circulates only inside the fuel tank 100 and the fuel does not return from the engine.

When water is mixed in the fuel, the water is so separated inside the housing 122 as to be accumulated in the lower space 162 of the housing 22. Since the inlet to the pressure regulator 130 is disposed at the lowest side of the housing 122, water can be definitely discharged from the pressure regulator 130, and thereby the water is prevented from flowing to the fuel injection apparatus. Moreover, since glass fibers having high affinity to water is mixed in the filtering paper of the element, water can become water drops, and thereby water can be easily separated and discharged certainly.

(Fourth Embodiment)

Figure 9:
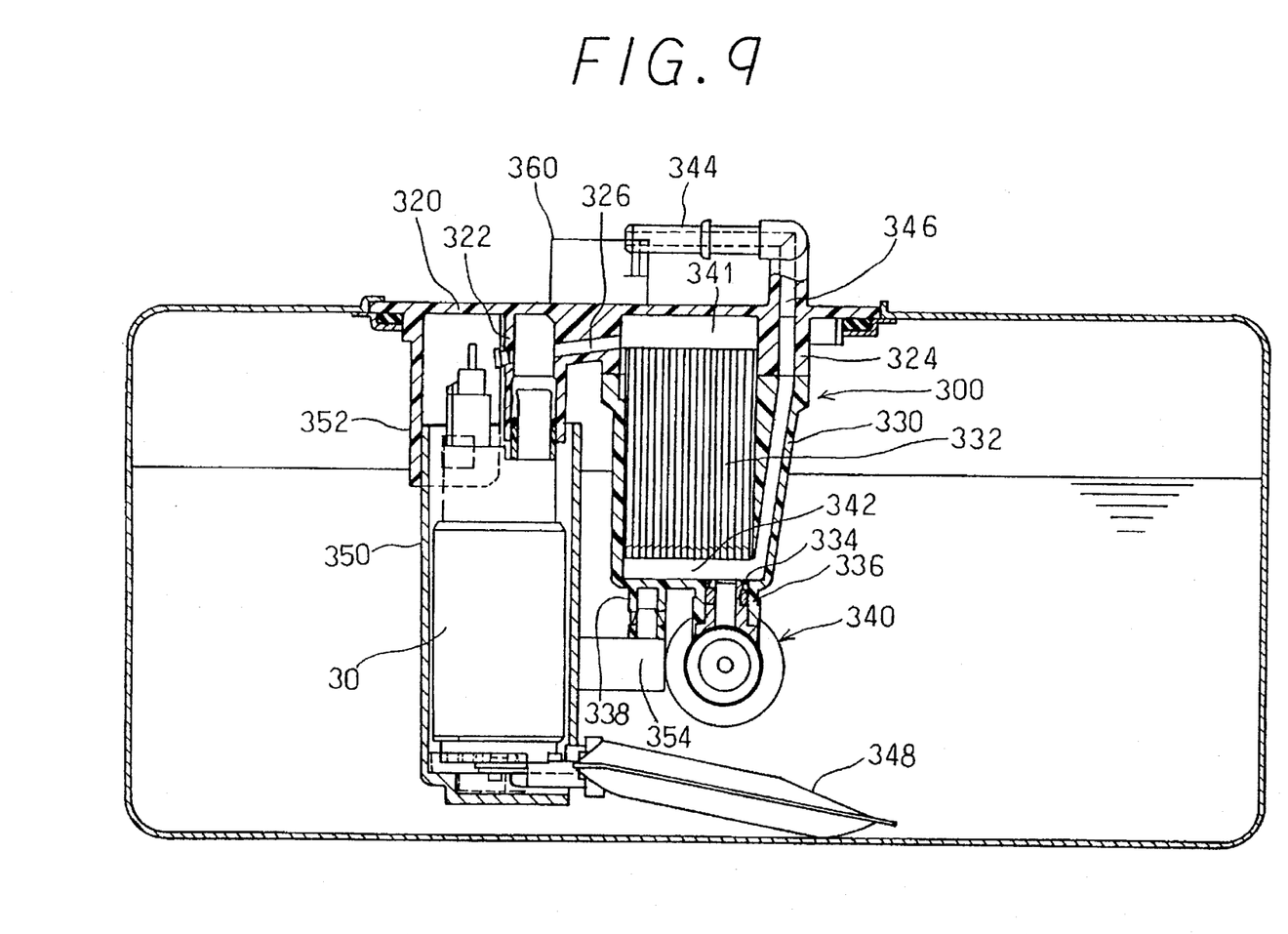
FIG. 9 is a longitudinal cross sectional view in a fourth embodiment.
Figure 10:
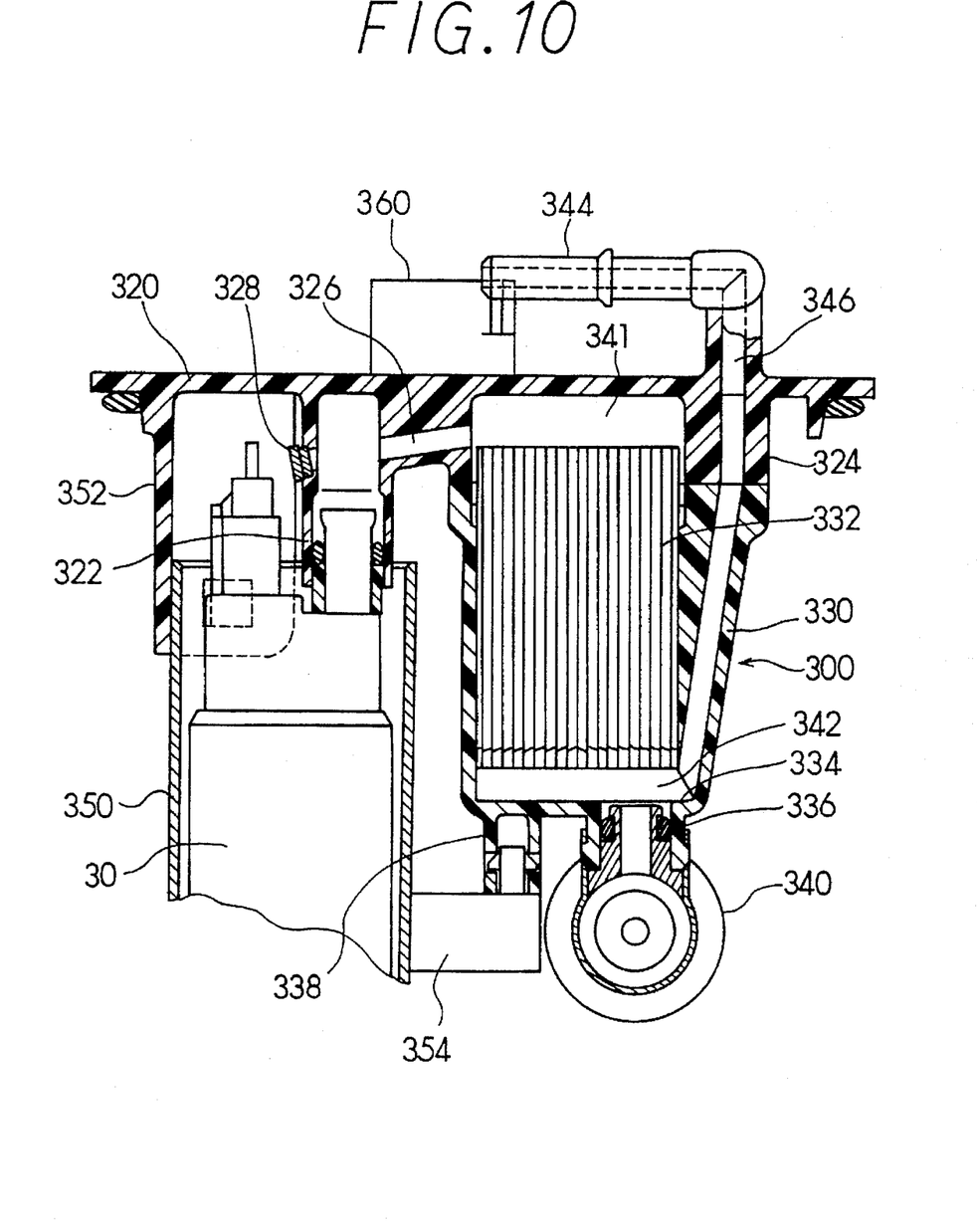
FIG. 10 is a cross sectional view of main portions in the fourth embodiment.
Figure 11:
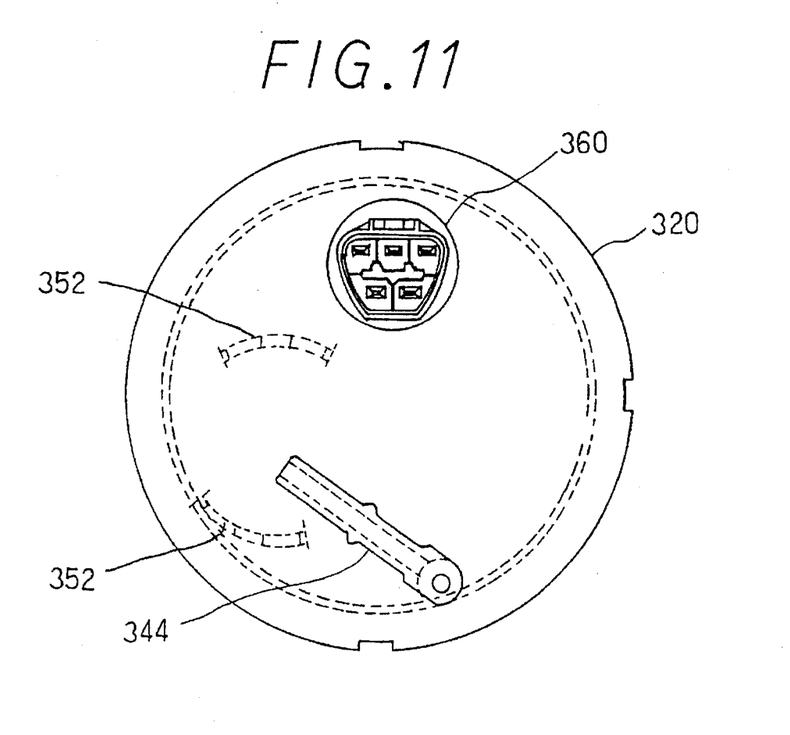
FIG. 11 is a top plan view of the fourth embodiment.

FIGS. 9–11 shows a fuel supply apparatus according to a fourth embodiment.

FIG. 9 is a cross sectional view showing an entire structure of the fuel supply apparatus. FIG. 10 is an enlarged cross sectional view and FIG. 11 is a plan view showing the cover viewed from the outside of the fuel tank. The same numerals are used for the same components as in the first embodiment.

According to the present embodiment, a cylindrical fuel filter 300 is disposed adjacent to the fuel pump 30 as shown in FIG. 9.

A communicating cylinder 322 is protrusively formed inside the fuel tank of a cover 320. A cylindrical portion 324 as the upper housing of the filter is disposed adjacent to the communicating cylinder 322. A through hole 326 is opened from the communicating cylinder 322 toward the cylindrical portion 324. The numeral 328 is a plug to close a hole for machining.

The lower housing 330 is welded to a lower portion of the cylindrical portion 324. A cylindrical filter element 332 is accommodated in the lower housing 330. A connecting port open to the pressure regulator 340 is provided at the bottom 334 of the lower housing 330. A fixing portion 336 for the pressure regulator 340 is disposed outside the bottom 334. Moreover, a connecting portion 338 is protrusively molded to connect the fuel pump 30 to the lower housing 330.

A fuel passage 346 is so formed as to extend upward in the wall of the lower housing 330 from the lower side chamber 342 of the fuel filter 300. The fuel passage 346 passes through the cover 320 and passes in a connecting pipe 344 disposed outside of the cover 320. The connecting pipe 344 connected to a fuel pipe (not shown) is also connected to the injectors of the fuel injection apparatus mounted on the engine.

The fuel pump 30 is accommodated in the cylindrical pump holder 350 while the mesh filter 348 is exposed. The engaging claw disposed on the pump holder 350 is fit into the engagement hole of a ring-shaped stay 352 extending from the cover 320. In addition, a connecting portion 354 connecting to the lower housing 330 of the filter 300 protrudes from the side wall of the pump holder 350. The connecting portion 354 is engaged with the lower side of the connecting portion 338 and the pump holder 350 is also hung from the filter 300. Moreover, the cover 320 is made of insulating resin whereas the pump holder 350 and the lower housing 330 are made of conductive resin, so that the pump holder 350 and the lower housing 330 are electrically connected.

The electric connector 360 is welded while passing through the cover 320.

In the present embodiment, the fuel is sucked by a driving operation of the fuel pump 30 through the filter 348 and discharged from the discharge pipe 33. The fuel passing through the passage 36 is lead to the upper side chamber 341 of the fuel filter 300. Then, it is filtered by the filter element 332 on the midway of flowing in the downward direction, and flows to the lower side chamber 342 of the filter 300. The pressure of the lower side chamber 342 of the filter 300 is adjusted by the pressure regulator 340 and surplus fuel returns to the tank 10 from the pressure regulator 340. At that time, water separated in the lower space returns to the fuel tank, so that it prevents the water from flowing to the injector through the passage 346.

According to the present embodiment, water in the fuel can be separated and discharged by using a conventional cylindrical filter.

In the aforementioned plural embodiments, both the fuel and water are discharged by discharging the fuel by the pressure regulator from the lower side chamber of the filter housing, however, the bottom of the housing can be an inclined surface tilting toward the pressure regulator to certainly separate the water. Also, the flow of the fuel inside the filter housing can be reversed. In this case, the fuel may flow upward after passing through the filter element from the lower side chamber, and a chamber for separating water may be disposed at the upstream side than the filter element.

A pressure regulator may be disposed at a position suitable to adjust the pressure of the fuel in the route of the fuel supply and also a valve used specially for removing water may be disposed in the fuel filter housing. As far as a valve is concerned, for instance., it may be preferable for a ball valve to open when the fuel pressure exceeds a predetermined value is preferable.

Various types of elements may be used for a fuel filter element.

FIELD OF INDUSTRIAL APPLICATION

As described above, according to the fuel supply apparatus of the present invention, water mixed in the fuel can be separated inside the fuel filter housing, so that the water accumulated inside the fuel filter housing can be automatically discharged. Thus, water is not accumulated in the fuel passage such as a fuel passage to the internal combustion engine from the fuel tank or fuel passage of fuel injection apparatus mounted on the internal combustion engine. In this way, it is possible to prevent such problems as corrosion of metallic parts or malfunction of functional parts. Such features are especially effective in a system without a return for surplus fuel to the fuel tank from the internal combustion engine, however, it is also effective to apply to a system with a return.

What is claimed is:

1. A fuel supply apparatus for supplying fuel in a fuel tank to a fuel consumption device, comprising:
    a member forming a fuel passage from said fuel tank to said fuel consumption device, said member further forming a separating chamber disposed in said fuel passage to separate said fuel from water, and a return passage open to a lower portion of said separating chamber and extending from said lower portion of said separating chamber; and
    a valve disposed in said return passage for opening or closing a passage from said return passage to said fuel tank according to pressure of said fuel supplied to said fuel consumption device from said fuel tank.

2. A fuel supply apparatus according to claim 1, wherein an inlet and an outlet of said separating chamber are disposed above said return passage.

3. A fuel supply apparatus according to claim 1, wherein, said member is disposed in said fuel tank, and forms said separating chamber and said return passage in said fuel tank; and
    said valve is accommodated in said fuel tank.

4. A fuel supply apparatus according to claim 1, wherein, said valve is a pressure regulator for opening said return passage when said fuel pressure exceeds a predetermined pressure in response to said fuel pressure in said separating chamber.

5. A fuel supply apparatus according to claim 1, wherein, said member defines a cover for closing an opening of said fuel tank.

6. A fuel supply apparatus according to claim 1, wherein said member is detachably installed on said cover for closing said opening of said fuel tank.

7. A fuel supply apparatus supplying fuel in a fuel tank to a fuel consumption device, comprising:
    a fuel filter disposed in a fuel passage from said fuel tank to said fuel consumption device for filtering fuel; and
    a pressure regulator disposed in said fuel passage from said fuel tank to said fuel consumption device for adjusting fuel pressure by returning surplus fuel to said fuel tank; wherein,
    said pressure regulator is connected to said fuel filter for taking out said fuel from a lower side space of said fuel filter to return said surplus fuel to said fuel tank.

8. A fuel supply apparatus according to claim 7, wherein,
    a first outlet to said fuel consumption device is formed in a space below said fuel filter;
    a second outlet connected to said pressure regulator is formed to pass said surplus fuel; and
    said second outlet is opened below said first outlet.

9. A fuel supply apparatus according to claim 8, wherein, said fuel filter element is disposed above said lower side space; and said fuel filtered by said fuel filter element flows into said lower side space.

10. A fuel supply apparatus according to claim 9, wherein, water affinity fibers are mixed with said fuel filter element.

11. A fuel supply apparatus according to claim 7, wherein, said fuel filter includes a filter housing in a shape of a container for accommodating said fuel filter element; and said pressure regulator is fixed to said filter housing.

12. A fuel supply apparatus according to claim 11, wherein said filter housing is detachably mounted on said cover of said fuel tank.

13. A fuel supply apparatus according to claim 11, wherein said filter housing is combined with said cover of said fuel tank;

said filter housing includes an inlet directly connected to a discharging pipe of a fuel pump supported by said cover; and said filter housing includes an outlet connected to said fuel consumption device.

14. A fuel filter housing disposed in a fuel supplying passage and accommodating an element filtering fuel, said fuel filter housing having an inlet, at least two outlets composed of a first and a second outlets; wherein, said inlet and said first outlet are disposed as a pair to define a series of a fuel passage through which consumed fuel passes;

said second outlet is disposed as an outlet of surplus fuel and is opened at a lower side of said filter housing so that water accumulated inside said filter housing is discharged with said surplus fuel.

15. A filter housing according to claim 14, wherein a connecting portion for connecting a pressure regulator is integrally disposed outside said filter housing.

16. A filter housing according to claim 14, wherein said filter housing is combined with a cover for closing an opening of a fuel tank.

17. A filter housing according to claim 16, wherein, said filter housing is integrally and non-separatively formed with said cover for closing said opening of said fuel tank.

18. A filter housing according to claim 16, wherein, said filter housing is detachably mounted on said cover for closing said opening of said fuel tank.

19. A filter housing according to claim 14, wherein, said inlet is disposed above said filter housing, said first outlet is disposed below said filter housing, and said filter housing further includes a fuel passage extending upward from said first outlet.

20. A filter housing according to claim 14, wherein, said inlet is disposed above said filter housing;

said first outlet is disposed below said filter housing; and said second outlet is disposed below said first outlet.

* * * * *